July 14, 1964

C. W. BRANDON 3,141,099

METHOD AND APPARATUS FOR FORMING AND/OR AUGMENTING
AN ENERGY WAVE

Original Filed May 21, 1954

Clarence W. Brandon
INVENTOR.

BY *[signature]*
Attorneys

July 14, 1964

C. W. BRANDON 3,141,099
METHOD AND APPARATUS FOR FORMING AND/OR AUGMENTING
AN ENERGY WAVE

Original Filed May 21, 1954

Clarence W. Brandon
INVENTOR.

BY *[signatures]*
Attorneys

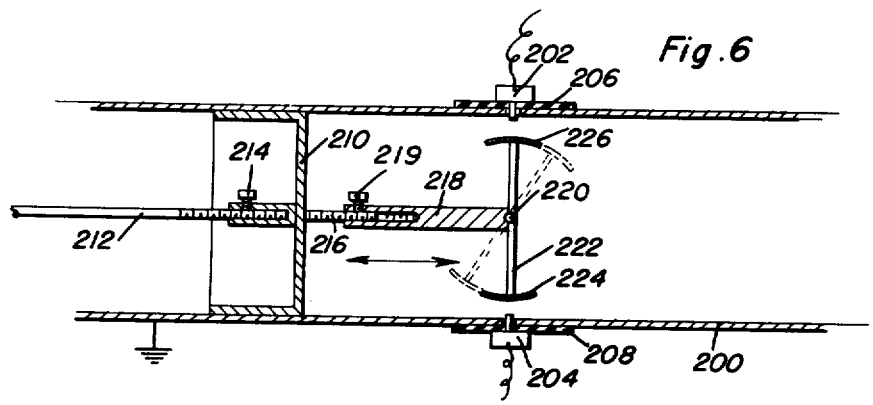
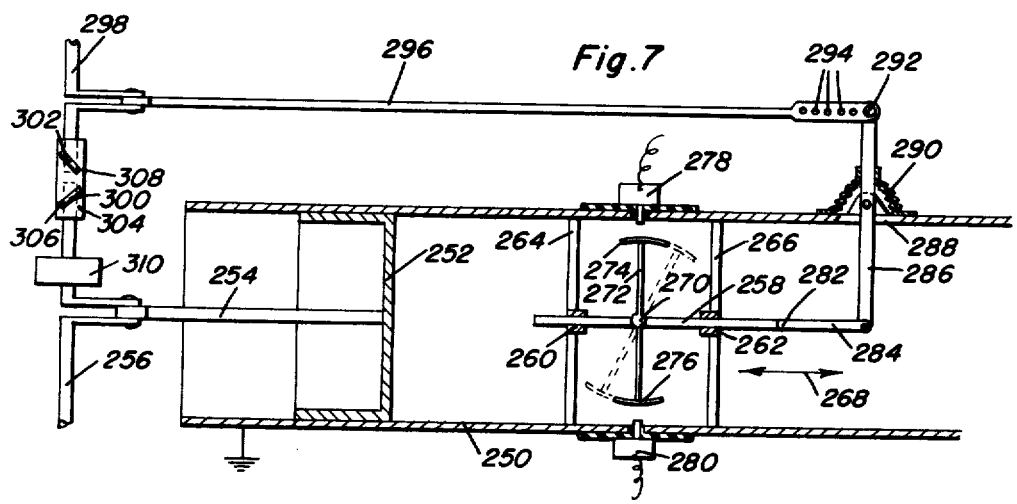
Clarence W. Brandon
INVENTOR.

United States Patent Office 3,141,099
Patented July 14, 1964

1

3,141,099
METHOD AND APPARATUS FOR FORMING AND/
OR AUGMENTING AN ENERGY WAVE
Clarence W. Brandon, Tulsa, Okla. (1412 Golf Terrace, Tallahassee, Fla.), assignor of twelve and one-half percent to Orpha B. Brandon, Tallahassee, Fla., and fifty percent to Nat A. Hardin, Catherine H. Newton, and Hazel H. Wright, all of Forsyth, Ga.
Continuation of application Ser. No. 431,388, May 21, 1954. This application Aug. 3, 1959, Ser. No. 833,122
10 Claims. (Cl. 310—4)

This invention relates to methods and apparatuses for forming and/or augmenting an energy wave and more specifically has reference to processes and means whereby electrical energy may be converted in an improved and advantageous manner into heat energy and may be then directly introduced into a fluid medium or into a pulsating energy wave in a fluid medium; or may be abstracted from such energy wave, whereby to vary the characteristics of the wave and facilitate the treating of formations and especially oil bearing formations thereby.

The present application is a continuation of my copending application Serial No. 431,388, filed May 21, 1954, now abandoned, which is a continuation-in-part of Serial No. 241,647, filed August 13, 1951, now Patent No. 2,796,129, dated June 18, 1957, and Serial No. 296,038, filed June 27, 1952, Now Patent No. 2,866,509, dated Dec. 30, 1958. The subject matter of this application also relates to the subject matter of my copending applications Serial No. 431,246, filed May 20, 1954, and Serial No. 434,299, filed June 3, 1954, now Patent No. 3,042,115.

It is axiomatic, as stated by generally recognized authorities in the study of the wave transmission of energy in a wave propagating medium, that heat applied to an energy carrying wave medium during the compression phase of an energy carrying wave therein, or abstracted during the rarefaction phase of such wave, will increase the energy content of the wave by that amount; while the application of heat during the rarefaction phase or its subtraction during the compression phase will decrease the wave energy content to that extent, and also, if heat be applied to the medium at the proper phase angle before and/or after the peak of the compression and/or rarefaction phases of the wave, the frequency of the energy carrying wave may be altered correspondingly. The present invention is concerned with and based upon this fundamental principal of wave mechanics, and utilizes electrical energy in different manners for these purposes.

In its various aspects therefore, the basic and fundamental purpose of this invention is to provide means and methods whereby electrical energy may be controllably converted into heat which, in turn, may be directly introduced into an energy carrying wave in order to augment, or modify the total energy content of the energy wave or to otherwise modify or control its characteristics; and, alternatively, to abstract heat or mechanical energy from an energy carrying wave.

A corollary object is to apply the foregoing object and principle to the recovery of gases and oils for petroliferous formations.

Another important object employing the principles of this invention is to controllably vary the characteristics of an energy wave, whereby to fracture and/or disintegrate a permeable formation.

A further important object of this invention is to provide processes and means whereby an energy carrying wave in a wave propagating medium may be initiated solely by the conversion of electrical energy to heat and the application of the latter to the medium.

An additional important specific object of the invention is to provide processes and means whereby the dielectric properties of a formation may be utilized for converting electrical energy into heat energy; and for directly applying the latter to to a formation or introducing the latter as energy into an energy carrying wave for treating the formation.

An additional object of this invention is to provide apparatuses and processes whereby the electrical energy may be continuously applied, or may instead be intermittently applied at controllable intervals, to a formation for the generation of heat therein; or for controlling the energy content of an energy carrying wave applied by a fluid pressure medium to the formation.

A still further important object of the invention is to provide apparatuses and processes in accordance with the preceding objects in which the variations in pressure of a fluid drive medium may be utilized to control the generation and the character of electrical impulses and their resultant conversion into heat.

A still further object of this invention is to provide apparatuses and methods as set forth in the preceding objects in which the charcteristics of an energy carrying wave, produced by a wave generator in a wave propagating medium, may be controlled by the adjustably timed application of electrically generated heat impulses into the medium at predetermined phased relationships with respect to the energy wave produced therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a somwhat diagrammatic detail view in vertical section through a portion of an oil bearing or other formation and showing a novel manner for applying a heat introducing means thereto, the heating means being adapted to apply dielectric heating or arc heating in a continuous or intermittent manner to the formation and being readily inserted into or withdrawn from the formation through a well bore therein;

FIGURE 2 is a view similar to FIGURE 1 but showing a modified construction wherein the dielectric or arc heating effect is varied by and/or in accordance with variations in pulsations applied to the fluid of a liquid drive for pressurizing an oil bearing formation to effect an application of heat in an intermittent or pulsating manner;

FIGURE 3 is a diagrammatic view in vertical section of a portion of an oil bearing formation showing a still further modified form of apparatus for introducing sensible heat into the formation and wherein a continuing intermittent application of heat impulses is effected by vertical oscillation of an impulse control timer and which may be varied as to intensity by intermittent greater pulsations of a fluid pressure medium applied to the oscillating timer and thence to the formation and which, by variation of the means pressure of the medium, will operate alternative electrodes to produce energy waves of different characteristics.

FIGURE 6 is a fragmentary longitudinal sectional view through a portion of a conduit and disclosing a means whereby mechanical energy may be applied to a wave propagating medium in the conduit and whereby heat energy may be directly introduced into the energy transmitting wave generated by the mechanical wave producing means; and wherein the characteristics and phase relationships of the mechanical wave generator and the heat introducing means may be independently varied; and FIGURE 7 is a view similar to FIGURE 6 but showing a still further modified construction wherein the mechanical wave generator and the heat introducing means may be synchronously driven from a common operating means and may be relatively adjusted.

Figure 1:
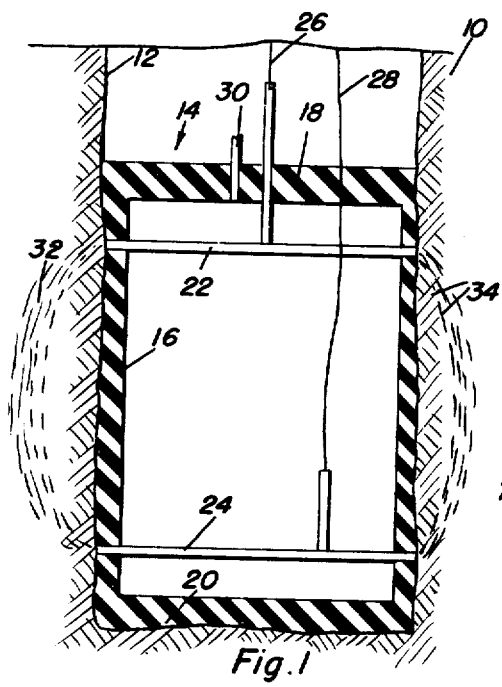

Embodiment of FIGURE 1

Figure 2:
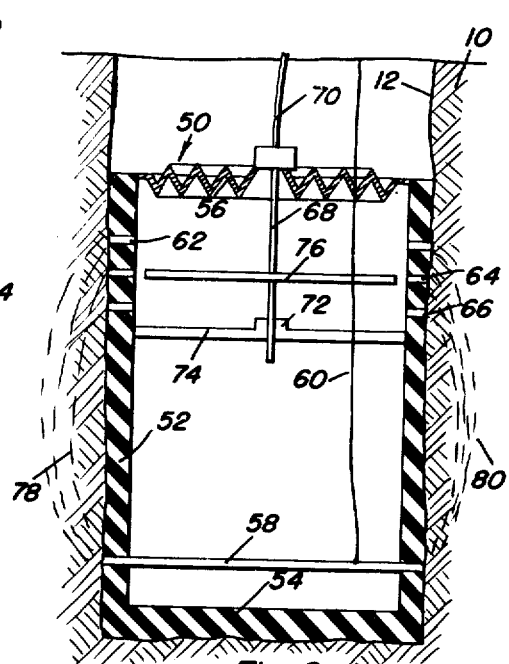

FIGURES 1 and 2 disclose embodiments in accordance with this invention wherein there is provided a compact and portable device which may be very easily introduced into or removed from a well bore in a geological formation as, for example, an oil bearing or gas bearing formation. Referring first to FIGURE 1, it will be seen that the geological formation indicated generally by the numeral 10 is provided with a well bore 12 therein which thus gives access to the interior of the formation which it is desired to treat in accordance with this invention.

In this form of the invention, the heat exchanger indicated generally by the numeral 14 is formed of a tough, deformable and yieldably expansible material of any desired character. The heat exchanger may conveniently comprise a body 16 whose interior is closed as by top and bottom walls 18 and 20, respectively. Carried by the body 16 are upper and lower electrodes 22 and 24 having their terminal portions exposed through the sides of the body. Conveniently, these electrodes may consist of straight rods disposed diametrically through the body, any desired number of these rods being provided as deemed to be expedient. Alternatively, the electrodes could consist of annular rings embedded in the exterior portion of the cylindrical body and having their outer faces flush with the exterior of the body. In any event, it is the purpose of this form of the invention to provide a plurality, two or more, spaced electrodes carried by the body which itself is of an insulating or dielectric material. Suitable electrical conductors 26 and 28 are connected with the electrodes 22, 24, and extending through a suitable protective sheath or housing, not shown, are in communication with a source of electric current.

In this form of the invention, it is contemplated that the heater 14 may be lowered by a cable or in any other desired manner to an appropriate position in the well bore 12 and adjacent that portion of a formation which is to be heated or treated in accordance with this invention. At that point the expansible cylindrical body 16 is diametrically or laterally extended or enlarged into intimate tight fitting contact with the wall of the bore 12. Any suitable means may be provided for effecting this distention of the body, as for example, by applying an increased internal pressure to the interior of the body as through a conduit 30 which may be provided, or by increasing the pressure upon the exterior of the body by increasing the pressure to which the fluid in the bore is subjected, to thus flatten and diametrically distend the body into the desired tight fitting engagement with the wall of the bore.

In any event, the body may be readily inserted into or removed from a well bore when the body is in its normal collapsed or non-distended position; and when inserted and properly placed may be readily expanded into a tight fitting engagement with the wall of the bore for anchoring the body in place. When so positioned, the body is in direct heat exchange relation with the geological formation 10. With the body in place, as shown in FIGURE 1, electric current from any suitable source is supplied to the conductors 26 and 28 and from thence to the electrodes 22 and 24. The electric current flows between the ends of the electrodes through the adjacent portion of the formation as indicated by the lines of flow 32 and 34. It will, of course, be apparent that, depending upon the position of the electrodes, and the number of the same, the lines or paths of flow of the current will vary; and the intensity of the heating effect may be controlled or adjusted.

The current flowing between the electrodes may be such as to provide dielectric heating or resistance heating of the formation by the passage of the current therethrough or to effect heating by establishing an arc between the electrodes and the like. As in the hereinafter described embodiments, the current may be supplied to the electrodes and consequently, the heat emitted from the same may be given a pulsating effect by properly timing the electrical impulses introduced to the electrodes by the conductors 26 and 28. With such an arrangement, the device may be employed solely for the purpose of heating a formation. However, and more important, this apparatus constitutes a means for initiating an energy carrying wave which will tend to vibrate and/or otherwise treat the formation; or may be used to apply heat energy into or remove the same from an energy carrying wave introduced into the formation from other sources, in the manner to be now set forth.

Assume that a fluid pressure medium, such as oil or water is being supplied under pressure to the well bore 12 for pressurizing or water driving the formation to aid in secondary oil recovery, this being a well known practice in the art. This fluid, as above mentioned, has distended the body 16 to secure the same at the desired location in the well bore and formation and also to establish a good heat exchange relation therewith.

This drive fluid may have an energy carrying wave produced therein whereby to produce pulsating pressures which are applied to the formation. The production of these energy waves and their modes of application to the formation form no part of the invention claimed herein, being set forth and claimed in my aforesaid copending applications for patent, Serial Numbers 241,647; 296,038; 431,246; and 434,299.

However, when electric energy is periodically or intermittently applied to the device 14 herein, it is preferred to apply the electric energy at the same or at a multiple of the frequency of the pulsations of the drive fluid; and to so time the electrical impulses relative to the fluid pressure pulsations that the electrical impulses and therefore, the resultant heat impulses, will be applied to the fluid medium always at the same phase of the energy wave in the medium.

It is now well known that when heat is applied to a medium during the compression phase of an energy wave therein, the energy of the heat is added to and increases that of the energy wave; while its application upon the rarefaction phase of the energy wave results in a corresponding decrease in the wave energy. Thus, this embodiment of the invention may be utilized to add energy to or subtract it from an energy wave which is treating a formation.

In some instances, the apparatus may be used to initiate and maintain an energy wave in the fluid drive medium. When heat is periodically generated and applied to the fluid, the adjacent layers of molecules of the fluid are expanded by the heat impulses and move away from the heater. Between successive heat impulses, cooler molecules move between the heated and expanded molecules and the heater body 16. In this manner, there is produced a continuing series or layers of heated, expanded molecules separated by cooler, contracted molecules. These layers constitute compression and rarefaction phases of an energy wave, just as though they were produced by reciprocation of a piston, or the vibrating of a wire in the medium.

This embodiment of the invention, therefore, presents a means which is compact and portable, easily applied to, removed from or adjustably positioned in a formation and which facilitates the conversion of electrical energy into heat and/or wave energy and its application to a fluid drive medium and to a formation for treating the latter.

Embodiment of FIGURE 2

The principles of the invention as disclosed in connection with FIGURE 1 are also applicable to the embodiment of FIGURE 2. As in the preceding embodiment, the heat exchanger 50 is illustrated as positioned in the well bore 12 of the formation 10 and distended into secure seating and sealing engagement therein as in the preceding embodiment. The exchanger 50 is also of a dielectric, yieldably expansible material, including a cylindrical body or body portion 52 together with a bottom wall 54. In place of the previously described top wall, the body is closed by a diaphragm or other flexible top wall 56.

An electrode 58 similar to the electrode 24 of FIGURE 1 is applied near the lower portion of the wall 52 of the heater body and is connected with an electric conductor 60 for supplying current to the same. However, in place of the other fixed electrode 22 of FIGURE 1, there is provided a plurality of sets of oppositely disposed electrodes 62, 64 and 66. It will be understood that any desired number of these electrodes may be provided, three having been illustrated for the sake of simplicity in setting forth the principles of this form of the invention. Secured to the central portion of the diaphragm 56 is a supporting rod 68 to which is connected an electric conductor 70. The lower end of the rod 68 is journaled in a suitable guide bearing 72 carried by a fixed supporting rod 74 upon the interior of the heater body. Intermediate its ends, the rod 68 is provided with a transverse bar 76 constituting a movable switch blade.

The arrangement is such that when the bar or switch blade 76 is in registration with one of the sets of oppositely disposed aligned contacts 62, 64 or 66, an electrical circuit will be established between the conductor 70, the rod 68, the blade 76, the selected contact, with the electrode 58 and the conductor 60. When the contact is so established, lines of flow for the current extend through the formation between the upper selected and activated electrodes 62, 64 or 66 and the lower electrode 58, as shown in the flow lines 78 and 80. These flow lines are identical in the functioning of each as regards the flow lines 32, 34 of the embodiment previously described. However, in this form of the invention, there is a further different joint action of the electrodes and their resulting flow lines. By varying the pressure to which the diaphragm 56 is subjected, the position of the switch bar 76 can be vertically adjusted to cause the same to selectively register with the pairs of electrodes 62, 64 or 66. Thus, the length of the flow lines 78, 80 can be adjusted, thereby varying the intensity of the resultant heating action.

Still further, however, it is possible to maintain a selected mean pressure upon the fluid, to cause the blade 76 to operatively register with a selected set of electrodes 62, 64 or 66 and then to impart a slight pulsation, relative to the selected mean pressure, to the fluid in contact with the diaphragm and thus cause a slight pulsing of the latter. This slight pulsation will be sufficient to displace the switch blade 76 by or through a slight vertical movement. This movement may be such as will be sufficient to intermittently make and break the circuit with respect to the adjacent selected upper pair of electrodes; but will be insufficient to cause the blade 76 to move into operative contact with any but the selected set of electrodes. Thus, an intermittent application of electric current between the electrodes is possible, thereby producing a pulsating emission of heat from the device into the formation, for the various purposes and functions set forth in connection with the preceding and previously described embodiments.

Still further, however, it is possible by increasing the amplitude of vertical vibration of the diaphragm 56 to cause the switch blade 76 to establish contact intermittently with more thna one selected pair of electrodes. Thus, if the blade is moved sufficiently, it will intermittently establish a circuit with the pair of electrodes 62 and the pair of electrodes 64; or between the pair of electrodes 64 and the pair of electrodes 66, it being evident that a pulsating application of heat is thereby possible; and that this application is of varying intensity since it will pass through flow paths of different lengths. Still further, the switch blade 76 may be so moved as to contact all of the electrodes in succession, thus producing to the maximum the sequential varying of the flow paths.

In the two forms disclosed in FIGURES 1 and 2, it will therefore be apparent that considerable variation in the characteristics of the heat input into a formation may be effected; and that variations in the pressure of the fluid to which the formation is subjected are utilized to control the variations and fluctuations in the heat input.

It is, of course, intended that, as in the embodiment of FIGURE 1, the heat energy imparted into the fluid medium by this embodiment may be used to initiate an energy transmitting wave in a propagating medium; or may function to modify or maintain an energy wave produced by other sources.

Figure 3:
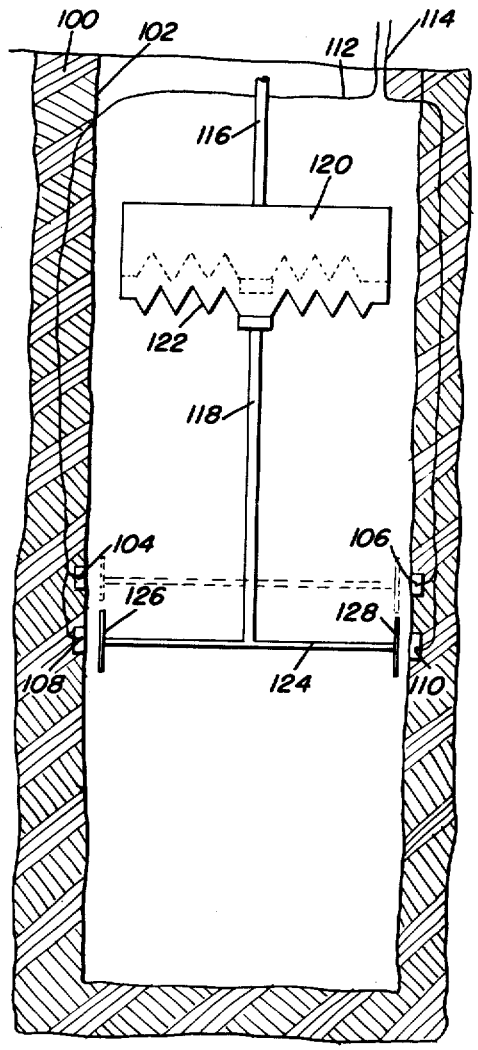

Embodiment of FIGURE 3

Figure 5:
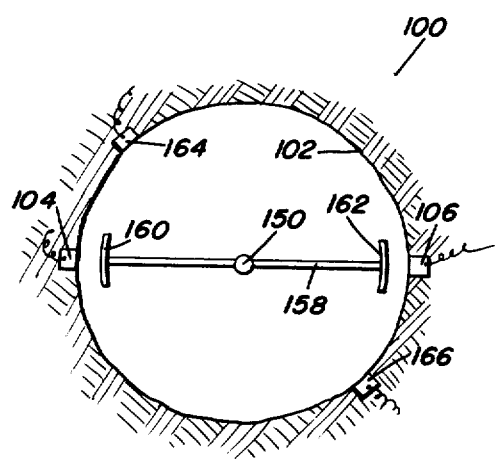
FIGURE 5 is a horizontal sectional detail view taken substantially upon the plane indicated by the section line 5—5 of FIGURE 4 and indicating a manner in which the phase angle of the heat impulses are correlated to provide an augmented energy transmitting wave which may be initiated and/or maintained by the heat-introducing device.
Figure 4:
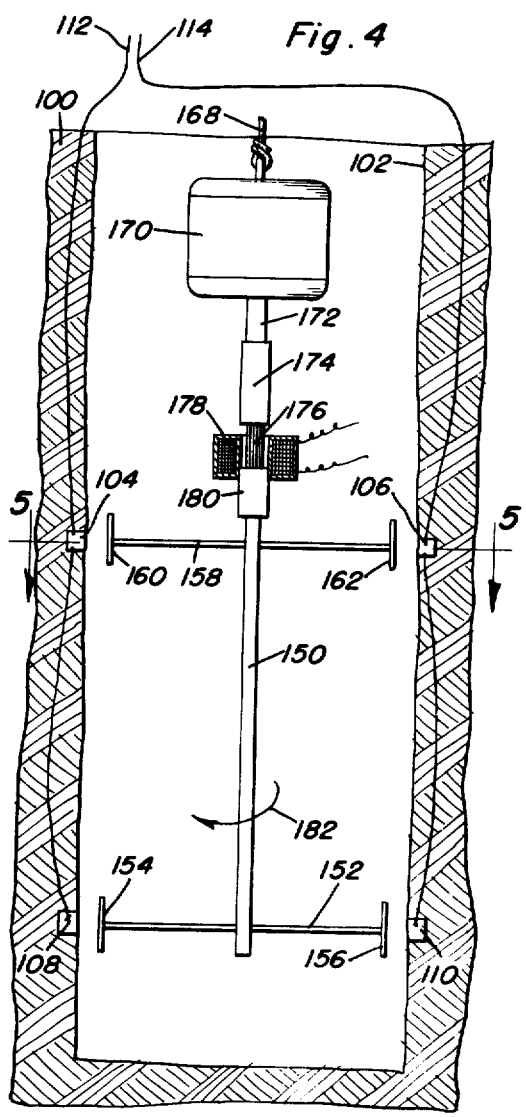
FIGURE 4 is a view of a modified construction similar to that of FIGURE 3 but wherein an electric motor or other power means is provided for rotating the heat impulse timing mechanism; and wherein a solenoid is provided for intermittently varying the characteristics of the heat impulses.

FIGURES 3, 4 and 5 disclose embodiments somewhat similar in principle to those of FIGURES 1 and 2. Thus, in each of FIGURES 3, 4 and 5, there is disclosed a geological formation 100 which may comprise an oil bearing formation having a well bore 102 therein. Secured in any desired manner in the sides of the well bore are two or more vertically spaced sets of aligned and oppositely disposed electrodes 104 and 106 for the upper set and 108 and 110 for the lower set. A pair of electric conductors 112 and 114 supplies current to these electrodes.

In the arrangement of FIGURE 3, the upper set of electrodes 104, 106 are relatively closely positioned with respect to the lower set 108, 110. The conductor 112 supplies current to the electrodes 104, 108; while the other conductor 114 supplies current to the electrodes 106, 110. Suitably supported within the well bore adjacent the electrodes, and mounted for vertical reciprocation with respect thereto, is an upper rod 116 which is aligned with a lower rod 118, the two rods being connected to opposite sides of a vertically reciprocable expansible chamber 120 having a movable diaphragm 122 forming one wall of the same. At its lower end, the rod 118 is provided with a transversely disposed switch bar or blade 124 which upon its opposite extremities is provided with vertically elongated switch members 126 and 128.

The arrangement is such that as the assembly consisting of the rods 116, 118, the expansible chamber 120 and the switch bar 124 are reciprocated vertically, as shown by the arrows, the switch contact members 126, 128 are moved vertically from the full lines to the dotted lines. This vertical reciprocation causes an arc to pass from the contact members 126, 128 to the adjacent electrodes 108, 110 or 112 or 114, or produces a dielectric or resistance heating effect. Thus, an electric heating arc is produced which serves to emit heat from the device into the adjacent formation. As in the preceding embodiments, the pulsations of the heat emission may be so timed as to produce or apply energy into an energy bearing wave, or to abstract energy therefrom.

In this form of the invention, it is further contemplated that variations in the pressure of the fluid medium within the well bore, applied to the sensitive expansion chamber device 120, will cause the diaphragm 122 thereof to flex between its full and dotted line positions. These pulsations will thus also effect a vertical displacement of the switch bar 124. By means of the expansible chamber device, the bar may be positioned adjacent the lower electrodes, as shown in full lines in FIGURE 3; or alternatively, may be positioned adjacent the upper electrodes as shown in dotted lines therein. Thus, the pressure pulsations may be relied upon as a means for positioning the switch bar to selectively activate different sets of electrodes.

Still further, the pressure variations may be such as to strike out or break the arc between the contacts 126, 128 and 104, 106 and/or 108, 110.

It is, of course, apparent that the pulsations applied by the member 120 may be combined with the vertical reciprocation of the members 116, 118 to thus more widely vary the types of heating effects and pulsations produced.

It is further contemplated that the electrodes 108 and 110 may be supplied with a different intensity of current from the electrodes 104 and 106 whereby when the contact members 126 and 128 are shifted vertically by the action of fluid pulsations upon the actuator 120, the different electric circuits will produce heating effects of greatly different intensities and heat content. These heat inputs can be timed to the energy wave in the fluid medium to selectively weaken or strengthen the energy thereof.

Further, by giving the bar 124 a sufficiently great vertical movement, the contacts 126 and 128 will be caused to operatively engage both sets of electrodes thereby applying additional electrical and heat energy to the wave energy.

Thus, fracturing, disintegrating and/or other desirable results may be effected in a permeable formation by this arrangement for controllably altering the characteristics of an energy wave.

Still further, the apparatus of FIGURE 3, as is also the case with the other modifications disclosed herein, may be used solely to initiate and/or maintain or modify an energy wave; while the conduit 116 may be operatively connected to a pilot source of hydraulic and/or electrical power in order to so control the paths of current travel at the electrodes that the characteristics and frequencies of energy waves may be variably controlled.

Embodiments of FIGURES 4 AND 5

The embodiment of FIGURES 4 and 5 differs from that of FIGURE 3 in that although the conductors 112, 114 are respectively connected to the electrodes 104, 108 and 106, 110, these latter sets of electrodes are more widely vertically spaced. Also, a different type and actuation of the switch member is provided.

In this embodiment, the latter consists of a bar 150, similar to the bar 118, having a transverse switch bar 152 carried thereby which, at its outer ends, has the switch contact plates 154 and 156. These plates register with the electrodes 108 and 110. Near the upper end of the rod 150 there is also provided a second transverse switch bar 158 having at its outer end the switch contact plates 160, 162, respectively registering with the electrodes 104, 106.

As shown in FIGURE 5, there is provided for each of the upper and lower sets of electrodes previously mentioned, corresponding angularly or circumferentially spaced second sets of electrodes, the upper pair of these being shown at 164 and 166, while the lower set, being similar, has not been illustrated. The second set of upper and lower electrodes is placed at any desired angular relation with respect to the first set of the upper and lower electrodes for sequential actuation by the members 154, 156 and 160, 162 in a manner and for a purpose which will be subsequently set forth.

Supported by a cable 168 or any other suitable support means in the well bore is an electric motor 170 or other suitable source of power having a driving shaft 172. This shaft terminates in or carries mounted thereon a collar or sleeve 174 terminating in a diametrically reduced stem-like extension splined at 176 and carried by and surrounding the same is a hollow solenoid 178 which may be supplied by current from any suitable source. The splined extremity 176 slidably receives thereon an internally splined cylinder 180 fixedly secured to the upper end of the rod 150 and supporting the latter, this cylinder being slidable within the solenoid and constituting an armature for the same.

When the solenoid 178 is energized, the plunger 180 is drawn upwardly into the same, thereby lifting the rod 150 and the switch bars 152, 158 carried thereby. When the solenoid is deenergized, these members are correspondingly lowered under the influence of gravity and/or by spring or any other suitable means, if desired.

By means of the elecrtic motor 170, rotation, as indicated by the arrow 182, is imparted to the rod 150 and to the switch bars. During this rotation, the upper switch blade members 160, 162 and the lower set 154, 156 first register with the upper pair of electrodes 104, 106 and the lower pair 108, 110 to establish an arc or a dielectric circuit for heating purposes. Upon further rotation through a predetermined angular interval, the switch contact members, as seen in FIGURE 5, register with the second sets of contacts 164 and 166 of the upper and lower sets to produce a second flow of current. It is contemplated that the angular interval between the electrodes 104, 164 and 106, 166 shall be such as to cause a predetermined timing between the two flows of current. This timing is such that a predetermnied relation will be imparted to the two waves initiated by the fluid current at the two sets of contacts. For example, a 45° angular displacement will serve to augment the energy content of the wave produced by the pulsating heat emissions of the device, as set forth in detail in my prior copending applications, Serial Numbers 241,647; 296,038.

It will be seen that during this continuous rotation of the switch bars 152 and 158, there may also be applied either at irregular intervals or periodically, a vertical reciprocation of the same through the solenoid. The movement will tend to draw out or prolong and/or cut off the flow of current through the electrodes and the adjacent switch blade contact members.

The form of the invention of FIGURES 4 and 5 therefore provides still further means and processes for varying the type and characteristics of the pulsating heat impulses introduced into a formation or the fluid mediums contacting the same, or varying the characteristics of an energy wave in a wave conducting medium.

Embodiment of FIGURE 6

FIGURES 6 and 7 disclose still further modifications which embody some of the principles of FIGURES 1–5. In the embodiment of FIGURE 6, a conduit 200, at any suitable location along the length of the same, is provided with a pair of electrodes 202 and 204 which extend into the conduit and are mounted in suitable insulating plates 206 and 208.

Reciprocable in the conduit is a piston 210 which is adjustably screw-threadedly engaged upon the extremity of an actuating rod 212, a setscrew 214 being provided to lock the piston in adjustment thereon. Extending forwardly from the face of the piston is an externally threaded stem 216 and screw threadedly adjustably secured upon this stem is a rod 218, a setscrew 219 being provided to secure the same in adjusted position upon the stem.

Adjustably pivoted at its midpoint to the end of the rod 218, as at 220, is a transverse switch bar 222 having at its opposite terminals elongated switch contact plates 224 and 226. As shown in full lines in FIGURE 6, the bar 222 is normally disposed at right angles to the rod 218 whereby the same will register simultaneously with the electrodes 202, 204 to produce an arc therebetween when current is supplied to the bar 222 in any desired manner. It will be understood, of course, that the rod 218 is of a suitable dielectric material if it is desired to establish a circuit through the members 202, 226, 222, 224 and 204.

Alternatively, however, the circuit may be established from the terminals 202 and 204 independently to the blades 226 and 224 and from thence to the rods 222, 218, 216, etc., to ground, these latter members thus being all in electric conducting relation. However, the bar 222 may be pivoted about its pivot pin 220, as to the dotted line position shown in FIGURE 6, at which time one of the plates such as the plate 226 will register with its electrode 202 before the other plate 224 is in registry with the electrode 204.

In this form of the invention, reciprocation of the piston 210, by means of the rod 212, in any desired manner, not shown, will produce pulsations in a fluid medium disposed in the pipe 200 and produce an energy carrying wave therein. At the same time, electric contact members will alternatively make and break electrical contacts with the electrodes 202, 204 and thus produce a flow of current therebetween, to thereby produce intermittent heat impulses imparted to the fluid within the pipe 200. It is evident that by adjusting the position of the bar 222 relative to the piston 210, the timing of the flow of electric current and consequently the emission of the heat impulses may be varied.

Further, by pivotally adjusting the bar 222 about its pivot pin 220, an electrical impulse at one electrode may be caused to lead that at the other by a predetermined amount whereby two impulses of a predetermined relative phase displacement may be produced to further alter the characteristics of the energy carrying wave. The functions and purposes of this form of the invention are similar to those previously set forth.

It is a most important feature of this embodiment that the switch members 226, 224, 202 and 204 may be energized to produce by their heating impulses in the fluid medium, one or two additional energy waves, which may be readily timed in various relations to the energy wave produced by the generator piston 210.

Embodiment of FIGURE 7

A somewhat more complex arrangement than that of FIGURE 6 is disclosed in FIGURE 7, wherein the pipe 250 is provided with a reciprocating piston 252 for producing pulsations in a fluid medium to initiate an energy carrying wave therein, the piston being carried by a piston rod 254 connected to an actuating member such as the crankshaft 256. A rod 258 is positioned axially of the pipe 250, being mounted in spaced bearings 260 and 262 carried by suitable spiders 264 and 266 in the pipe and being reciprocable as shown by the arrow 268. Adjustably pivoted at 270 to the midportion of the rod 258 between the spiders is a transverse switch bar 272 having elongated switch contact plates or blades 274 and 276.

Cooperating with the switch bar 272 are a pair of electrodes 278 and 280, the function of the rod 258 and of the contacts and electrodes being identical with that of the rod 218, and the switch contact members and electrodes in FIGURE 6. However, in order to impart reciprocatory motion to the rod 258, the same is pivoted at one end as at 282 to a link 284, in turn connected to a lever 286. The latter extends through an opening 288 in the side of the conduit, inside a flexible covering 290, and at its outer end is connected, as at 292, in one of a series of adjusting apertures 294 in the extremity of a connecting rod 296. It is thus evident that reciprocation of the rod 296 will actuate the electric circuit making and breaking members in the same manner set forth in connection with the corresponding elements of FIGURE 6.

In the present embodiment, the operation of the contact members is synchronized and is adjustable with respect to the operating of the piston member. Thus, a crank shaft 298 is provided in alignment with the crankshaft 256, and is connected to the connecting rod 296 for actuating the same. The adjacent aligned ends of the shafts 256 and 298 are provided with radially and laterally extending connecting pins 300 and 302. An actuating sleeve 304 is provided and is slidably received upon the adjacent ends of the two crankshafts, this sleeve having oppositely inclined adjusting slots 306 and 308 in which are respectively slidably received pins 300 and 302. Obviously, upon axial sliding movement of the sleeve 304, the two crankshafts are rotatably adjusted with respect to each other, thereby changing the relationship of the piston 252 and of the switch bar 272. In this manner, any desired phase relation can be obtained between the wave generated by the piston 252 and the wave impulses or the timed application of the periodic heat impulses of the circuit controlling members.

It is also obvious that providing any desired gear reduction or increase arrangement, as by the speed varying means 310, between crankshafts 298 and 256, a wave of one freqeuncy, either continuously or intermittently, may be created by the electric wave generators of FIGURES 6 and 7 and thus combined with the energy waves produced by the pistons 210 and 252, respectively.

The two embodiments of FIGURES 6 and 7 provide means for securing a large variety of very precise phase adjustments between the various energy waves produced, so as to add electrical energy, as heat, to the main produced energy wave at any variable phase angle either continuously or periodically, thereby adding to or subtracting from the energy content of a wave and/or varying the frequency of the energy wave to obtain wave forms of controllable characteristics.

It is within the purview and concept of this invention as set forth in the embodiments of FIGURES 3–5, to mount the sets of stationary electrodes upon any suitable support whereby the same may be rotated, in conjunction with the sets of movable electrodes in order to cause the formation of the electric arcs or other flow of electric current throughout various portions of the surrounding medium or formation.

What is claimed as new is as follows:

1. The process of augmenting an energy wave in a wave transmitting medium comprising the steps of moving a member in said medium to produce said energy wave, positioning and producing an electric arc in said medium coincident with the movement of said member, whereby the heat energy from said arc is periodically introduced into said energy wave at a predetermined phase angle of said wave.

2. The process of claim 1 wherein the steps of positioning and producing an electric arc includes moving an electrode coincident with the movement of said member and relative to another electrode.

3. The process of claim 1 including the step of varying the position of said energy wave produced by said member relative to the position of said arc.

4. The process of claim 1 including the step of varying the duration and length of said electric arc.

5. An apparatus for introducing electrically produced heat energy into an energy transmitting wave in a wave transmitting medium at a predetermined phase angle of the wave, comprising: a chamber having an energy transmitting medium therein and a reciprocable member in said chamber for generating an energy transmitting wave in a medium, a stationary electrode, a movable electrode cooperating therewith, said electrodes extending into the medium in said chamber, means connecting the movable electrode to the member for movement therewith and for movement into and out of arcing contact with the stationary electrode, means for establishing an electric circuit through said electrodes, means to adjust the movable electrode relative to the member to vary the positions of the electric arc relative to the member for controlling thereby the phase relation of the arc and wave.

6. The combination of claim 5 wherein said movable electrode is pivoted to said connecting means to vary thereby the time of establishing arcing contact between said electrodes.

7. The combination of claim 5 including means to vary the path of travel of said member to thereby vary the phase angle of a standing wave produced by the member relative to said stationary electrode.

8. The combination of claim 5 wherein said connecting means is directly carried by said member.

9. The combination of claim 5 wherein said connecting means and said member are connected to a common driving means.

10. The combination of claim 5 wherein said connecting means and said member are connected to a common driving means, and means to adjust the timed relation of the movable electrode and the member.

References Cited in the file of this patent

UNITED STATES PATENTS

| | | |
|---|---|---|
| 709,868 | Bradley et al. | Sept. 30, 1902 |
| 1,146,212 | Sullivan | July 13, 1915 |
| 1,744,173 | Longhi | Jan. 21, 1930 |
| 1,993,244 | Martin | Mar. 5, 1935 |
| 2,501,954 | McKechnie et al. | Mar. 28, 1950 |
| 2,549,464 | Hartley | Apr. 17, 1951 |
| 2,670,801 | Sherborne | Mar. 2, 1954 |
| 2,796,129 | Brandon | June 18, 1957 |
| 2,796,735 | Bodine | June 25, 1957 |
| 2,836,033 | Marrison | May 27, 1958 |
| 2,866,509 | Brandon | Dec. 30, 1958 |